2,783,221

WATER-SOLUBLE PROTEIN PREPARATIONS AND METHODS OF MAKING THEM

Paul Nitsche, Dresden, Germany

No Drawing. Application March 23, 1954,
Serial No. 418,221

Claims priority, application Germany March 25, 1953

7 Claims. (Cl. 260—112)

This invention relates to new water-soluble protein-containing preparations and methods of making them. More particularly as a result of this invention difficultly-soluble proteins are rendered readily soluble and without material change of their natural structure or state; aqueous or other solutions thereof can be formed of such difficultly-soluble proteins in their native form and such solutions can be used, as in in vitro tests of the human organism or in repeating other biological processes, in urine analyses, and for therapeutic purposes since when applied to humans as per os or parenterally, they accelerate the reaction of the ferments in the human body.

The object of the present invention, therefore, is to provide solutions or dry compositions comprising normally difficultly-soluble proteins, which solutions or compositions are readily soluble or miscible with water, and in which the natural structure of the difficultly-soluble protein remains substantially unaltered. A further object of the invention is to provide a method of preparing such a solution or dry composition. A still further object is to provide relatively high water-soluble compositions and aqueous solutions of normally difficultly-soluble compositions which are suitable for therapeutic and biological purposes.

The new water-soluble protein preparations of this invention comprise a normally difficultly-soluble protein, such as fibrin, casein, gluten, etc., in association with calcium lactate or magnesium sulphate or a mixture of these salts. The precise structure of these new preparations is not fully understood but it is believed that they comprise addition products of the protein and salt or salts. In any event, and as stated, the natural or native character of the protein structure is retained, that is the form of the peptide chains and their relative positions, as determined by a system of principal valences and van der Waal's or secondary valences is left substantially unaltered.

It was known prior to this invention that difficultly-soluble proteins, such as fibrin, casein and gluten, will dissolve in small amounts in dilute common salt solutions, but these solutions are of no practical value. Similarly it was known that these proteins can be converted into soluble materials by treatment with alkali, but this alters their natural character and degrades them. The compositions of the present invention, on the other hand, provide solutions of high protein concentrations without loss or degradation of the natural protein character of the protein portion of the compositions, and these solutions are of substantial practical importance.

In accordance with this invention difficultly-soluble proteins, such as fibrin, casein, gluten etc., are brought into solution at temperatures of below about 45° C. by means of aqueous solutions of calcium lactate, magnesium sulphate or mixed solutions of these salts. The concentration of the calcium lactate and/or magnesium sulphate solution employed may vary from about 0.5% to 15% of calcium and/or magnesium salt, the preferred range of concentration being from about 6% to about 7.5%. When a mixed solution containing both calcium lactate and magnesium sulphate is used the salts may be present in any proportions relative to each other.

The preferred temperature range for the dissolution of the protein in the salt solution is from 10° to 45° C., and the particularly preferred range from 15° to 25° C. At temperatures in excess of 45° C. degradation of the protein occurs, while at temperatures of below 10 C., solution takes place too slowly to be practical, although it does occur.

It is desirable to adjust the pH of the salt solution to about 8.0 as by the inclusion of $Ca''$, $Mg''$, $Na'$ or $K'$ ions in the solution, for example, by adding a suitable amount of lime water.

The rate of solution depends on the temperature, the higher the temperature, the speedier is the solvent action: at 37° C. for example strong solutions of proteins are obtained very rapidly. At temperatures of 20° C. or so, it takes about one week for full solution to take place.

The saturated calcium lactate or magnesium sulphate solutions will dissolve up to 10 parts by weight of difficultly-soluble protein without degradation of the latter to any material extent. Of course more dilute solutions can be prepared if desired. In general the invention includes from very dilute to saturated solutions of protein. The solution is desirably neutralized by addition of lactic acid to a pH of 7.3, i. e. to the isoelectric point for the protein.

The resulting solution may be concentrated at low temperatures, e. g. below 25° C., under vacuum and result in dry masses which can be readily pulverized. These dry products are readily redissolved in water to form homogeneous solutions or dispersions; highly dilute solutions of say 1:20 are water-white or only very slightly opaque.

The following examples are given by way of illustration and without limitation of the invention thereto:

Example 1

One liter of a 6% calcium lactate solution is rendered slightly alkaline, that is its pH is adjusted to about 8.0 by the addition thereto of lime water. To the resulting solution there is introduced under moderate agitation at ordinary temperatures, 10 grams of fibrin. The mixture is subjected to occasional stirring while being maintained at room temperature for a period of about one week. By this time all of the fibrin has entered into solution and the solution is milky white. Dilute lactic acid is then added to adjust the pH to 7.3.

The resulting solution may be used directly for therapeutic or biological purposes or in assays, or it may be dried at temperatures below 45° C., preferably under vacuum, to result in a dry product which is readily pulverized. The dry product so obtained is very stable and can be redissolved in water without difficulty. The protein component of the dry product retains its natural characteristics unchanged.

Similar results are secured when a 6% solution of magnesium sulphate is used in place of the calcium lactate, and likewise when use is made of a solution containing both calcium lactate and magnesium sulphate in equal proportions, the total percentage of the mixed salts amounting to 6%.

Example 2

One liter of a 6% calcium lactate solution is prepared as described in Example 1, and the pH of the solution is adjusted to 8.0 by the addition thereto of dilute alkali. To this solution 5 grams of dried casein are introduced under moderate agitation and brought into solution therein at a temperature of 37° C. in less than one hour's time. The resulting solution is then neutralized with dilute lactic acid to a pH of 7.3 and if desired it is then dried under vacuum at temperatures of below 45° C.

As set forth in Example 1, the calcium lactate solution in this example may also be replaced by corresponding amounts of magnesium sulphate or of mixtures of calcium lactate and magnesium sulphate.

While in the foregoing examples and in the preferred practice of the invention the protein is introduced into an aqueous solution of calcium lactate and/or magnesium sulphate, the salts and the protein may be mixed together in the dry state and then introduced into water for solution therein. However it is preferable to form the solution of the salt first in order that its pH may be adjusted slightly to the alkaline side prior to the introduction of the protein therein, since as indicated solution then takes place more readily. In the foregoing examples the reference to water means distilled water; distilled water is not essential to effect solution but is preferable in view of the therapeutic or biological purposes to which the solutions are primarily intended. While more concentrated solutions of salts can be used, this results in excessive dilution of the protein proportion of the ultimate solution or dry product and since the purpose of this invention is to provide highly concentrated protein compositions which are readily water soluble, the presence of more than the indicated proportions of calcium lactate and magnesium sulphate is undesirable. Mixtures of proteins can be similarly dissolved to form mixed protein compositions and the solutions may also include other substances which are without effect on the solubilizing action of calcium lactate or magnesium sulphate on the proteins.

I claim:

1. A method of forming water-soluble compositions comprising water-insoluble proteins in the native state selected from the group consisting of fibrin, casein and gluten, which comprises dissolving not more than 1% by weight based on the weight of solvent of said water-insoluble protein in the native state, at a temperature of not in excess of 45° C., in an aqueous solution having a pH of about 8.0 and containing from 0.5% by weight to a saturated solution of at least one member of the group consisting of magnesium sulphate and calcium lactate.

2. A method as claimed in claim 1, in which the temperature is from 15° to 25° C.

3. A method as claimed in claim 1 in which the aqueous solution contains from 6% to 7.5% of said salt.

4. A method as claimed in claim 1 which comprises forming an aqueous solution containing from 0.5% to 15% by weight of at least one member of the group consisting of magnesium sulphate and calcium lactate, adjusting the pH of said solution to about 8.0, adding said protein thereto, dissolving said protein therein, and then adjusting the pH of the resulting solution to the isoelectric point for said protein.

5. A method as claimed in claim 1 which further comprises evaporating the resulting solution to dryness at a temperature of less than 45° C. and under vacuum.

6. Aqueous solutions of proteins selected from the group consisting of gluten, fibrin and casein, in the native state, prepared by the method of claim 1.

7. Solid water-soluble protein preparations prepared by the method of claim 5.

References Cited in the file of this patent
UNITED STATES PATENTS

| | | |
|---|---|---|
| 183,024 | Ross et al. | Oct. 10, 1876 |
| 2,103,153 | Dunham | Dec. 21, 1937 |
| 2,401,919 | Ender | June 11, 1946 |
| 2,639,235 | Kennedy et al. | May 19, 1953 |

FOREIGN PATENTS

| | | |
|---|---|---|
| 154,627 | Great Britain | Dec. 9, 1920 |

OTHER REFERENCES

Anson et al.: "Advances in Protein Chem.," vol. 5, pp. 210 (1949).